United States Patent
Beppu et al.

(10) Patent No.: US 10,336,560 B2
(45) Date of Patent: Jul. 2, 2019

(54) TRANSFER APPARATUS

(71) Applicant: Azbil Corporation, Tokyo (JP)

(72) Inventors: Hisashi Beppu, Tokyo (JP); Yoichi Okawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 16/085,115

(22) PCT Filed: Mar. 25, 2016

(86) PCT No.: PCT/JP2016/059733
§ 371 (c)(1),
(2) Date: Sep. 14, 2018

(87) PCT Pub. No.: WO2017/163421
PCT Pub. Date: Sep. 28, 2017

(65) Prior Publication Data
US 2019/0077613 A1  Mar. 14, 2019

(51) Int. Cl.
*B65G 54/02* (2006.01)
*B65G 25/04* (2006.01)
(Continued)

(52) U.S. Cl.
CPC ............ *B65G 54/02* (2013.01); *B65G 25/04* (2013.01); *F16H 25/24* (2013.01); *F16H 49/00* (2013.01); *F26B 5/06* (2013.01)

(58) Field of Classification Search
CPC ........ B65G 54/02; B65G 47/82; B65G 25/04; B65G 23/20; F16H 25/24; F16H 49/00; F26B 5/06
(Continued)

(56) References Cited

U.S. PATENT DOCUMENTS 2,223,639 A * 12/1940 Ponder ................. B65G 23/20
                                                     198/832
4,624,617 A * 11/1986 Belna ..................... B65G 54/02
                                                     198/619
(Continued)

FOREIGN PATENT DOCUMENTS

JP    H01-315205 A    12/1989
JP    2937883 B2      8/1999
(Continued)

OTHER PUBLICATIONS

International Search Report received for PCT Patent Application No. PCT/JP2016/059733 dated Jun. 21, 2016, 4 pages (2 pages of English Translation of International Search Report and 2 pages of Original International Search Report).

*Primary Examiner* — James R Bidwell
(74) *Attorney, Agent, or Firm* — Amster, Rothstein & Ebenstein LLP

(57) ABSTRACT

A transfer apparatus comprises a first rod-shaped member comprising a magnetic material; a first terminal member configured to allow insertion of a first end portion of the first rod-shaped member; a second terminal member configured to allow insertion of a second end portion of the first rod-shaped member; a second rod-shaped member comprising a magnetic material; a third terminal member configured to allow insertion of a first end portion of the second rod-shaped member; a fourth terminal member configured to allow insertion of a second end portion of the second rod-shaped member; a coupling member coupling the second terminal member and the third terminal member; and an opposite member facing a part of side surfaces of the first and second rod-shaped members, wherein the first rod- (Continued)

shaped member and the first terminal member are not fixed, the first rod-shaped member and the second terminal member are fixed to each other.

20 Claims, 14 Drawing Sheets

(51) Int. Cl.
*F16H 25/24* (2006.01)
*F16H 49/00* (2006.01)
*F26B 5/06* (2006.01)

(58) Field of Classification Search
USPC .................................................. 198/619, 805
See application file for complete search history.

(56) References Cited

U.S. PATENT DOCUMENTS

| | | | |
|---|---|---|---|
| 5,086,729 A | | 2/1992 | Katagiri |
| 5,906,262 A | * | 5/1999 | Miki ...................... B65G 54/02 198/341.02 |
| 6,561,343 B2 | * | 5/2003 | Miyauchi .......... H01L 21/67709 198/619 |
| 2016/0176643 A1 | * | 6/2016 | Gao ..................... B65G 17/002 198/794 |
| 2016/0289011 A1 | * | 10/2016 | Itoh ........................ B65G 37/00 |

FOREIGN PATENT DOCUMENTS

| | | |
|---|---|---|
| JP | H11-314756 A | 11/1999 |
| JP | 3122367 B2 | 1/2001 |
| JP | 2003-343438 A | 12/2003 |
| JP | 2008-019019 A | 1/2008 |

* cited by examiner

TRANSFER APPARATUS

CROSS-REFERENCE TO RELATED APPLICATION

This application is a National Stage entry under 35 U.S.C. 371 of International Patent Application No. PCT/JP2016/059733, filed on Mar. 25, 2016, the entire contents of which is incorporated by reference herein.

TECHNICAL FIELD

The present invention relates to a transfer technique, more particularly, to a transfer apparatus.

BACKGROUND ART

In a transfer apparatus using a magnetic screw, a male screw made of a magnetic material is rotated to move a nut made of a magnetic material in a direction of a central axis of the male screw. The male screw made of a magnetic material may be covered with a cover having a cylindrical shape and made of a nonmagnetic material so as to move the nut smoothly or prevent corrosion of the male screw (for example, see PTL 1). In order to avoid contact between the male screw and the nut due to flexure of the male screw, the male screw is sometimes divided for installation (for example, see PTL 2).

CITATION LIST

Patent Literature

PTL 1: Japanese Patent No. 2937883
PTL 2: Japanese Patent No. 3122367

SUMMARY OF INVENTION

Technical Problem

Mandrels made of a nonmagnetic material are connected to both ends of a male screw made of a magnetic material and a driving device for rotating the male screw may be connected to one of the mandrels. The male screw may be divided for installation in order to alleviate flexure due to a magnetic force or its own weight. Here, a heat expansion ratio of the male screw made of a magnetic material is different from the heat expansion ratio of the cover or the mandrel made of a nonmagnetic material. Accordingly, when the male screw is fixed to the cover and the mandrel completely, a stress is generated due to a difference in heat expansion ratios. Accordingly distortion or breakage may result. Therefore, the stress generated due to the heat may be alleviated by fixing one of each of the male screws, the mandrels, and the covers, and leaving the other one of each of those members free. However, the inventors have found that this method of fixation may reduce a thrust force that can be generated by a magnetic screw at a male screw coupling portion and may cause an unstable operation. Accordingly, it is one of the objects of the present invention to provide a transfer apparatus capable of alleviating a stress that may be generated due to thermal expansion and contraction without reducing a thrust force generated at a male screw coupling portion.

Solution to Problem

According to an aspect of the present invention, there is provided a transfer apparatus comprising: (a) a first rod-shaped member comprising a magnetic material; (b) a first terminal member configured to allow insertion of a first end portion of the first rod-shaped member. (c) a second terminal member configured to allow insertion of a second end portion of the first rod-shaped member; (d) a second rod-shaped member comprising a magnetic material; (e) a third terminal member configured to allow insertion of a first end portion of the second rod-shaped member; (f) a fourth terminal member configured to allow insertion of a second end portion of the second rod-shaped member; (g) a coupling member configured to couple the second terminal member and the third terminal member; and (h) an opposite member facing a part of side surfaces of the first and second rod-shaped members and comprising a magnetic material, wherein (i) the first rod-shaped member and the first terminal member are not fixed, (j) the first rod-shaped member and the second terminal member are fixed to each other, and (k) when the first and second rod-shaped members rotate, the opposite member moves along central axes of the first and second rod-shaped members.

In the transfer apparatus described above, a concave portion configured to allow insertion of the first end portion of the first rod-shaped member may be provided in the first terminal member, and an insertion depth of the first end portion of the first rod-shaped member may be smaller than a depth of the concave portion of the first terminal member, so that an end surface surrounding the concave portion of the first terminal member does not have to make contact with the first rod-shaped member.

In the transfer apparatus described above, the first rod-shaped member and the second terminal member may be fixed to each other by welding. Alternatively, the first rod-shaped member and the second terminal member may be fixed to each other by a fastening pin. The first rod-shaped member may make contact with the first terminal member via a key.

As an alternative configuration of the transfer apparatus described above, the transfer apparatus further comprises a first cover formed of a nonmagnetic material and configured to cover the first rod-shaped member, the first cover and the first terminal member are fixed to each other, and the first cover and the second terminal member are fixed to each other. As an alternative configuration of the transfer apparatus, the first cover and the first terminal member are fixed to each other by welding, and the first cover and the second terminal member are fixed to each other by welding.

As an alternative configuration of the transfer apparatus described above, the first terminal member and the second terminal member may be made of a nonmagnetic material.

As an alternative configuration of the transfer apparatus described above, the second rod-shaped member and the third terminal member are fixed to each other, and the second rod-shaped member and the fourth terminal member are not fixed.

In the transfer apparatus described above, a concave portion configured to allow insertion of the second end portion of the second rod-shaped member may be provided in the fourth terminal member, and an insertion depth of the second end portion of the second rod-shaped member may be smaller than a depth of the concave portion of the fourth terminal member, so that an end surface surrounding the concave portion of the fourth terminal member does not have to make contact with the second rod-shaped member.

In the transfer apparatus described above, the second rod-shaped member and the third terminal member may be fixed to each other by welding. Alternatively, the second rod-shaped member and the third terminal member may be fixed to each other by a fastening pin. The second rod-shaped member may make contact with the fourth terminal member via a key.

As an alternative configuration of the transfer apparatus described above, the transfer apparatus further comprises a second cover formed of a nonmagnetic material and configured to cover the second rod-shaped member, the second cover and the third terminal member are fixed, and the second cover and the fourth terminal member are fixed. As an alternatively configuration of the transfer apparatus, the second cover and the third terminal member are fixed by welding, and the second cover and the fourth terminal member are fixed to each other by welding.

In the transfer apparatus described above, the third terminal member and the fourth terminal member may be made of a nonmagnetic material.

In the transfer apparatus described above, the first rod-shaped member may be stored in a furnace. The first and second rod-shaped members may be store in the furnace.

As an alternative configuration of the transfer apparatus described above, the transfer apparatus further comprises a driving device connected to the first terminal member, and the driving device is configured to rotate the first and second rod-shaped members about central axes of the first and second rod-shaped members. As an alternative configuration of the transfer apparatus described above, the transfer apparatus further comprises a driving device connected to the fourth terminal member, and the driving device is configured to rotate the first and second rod-shaped members about the central axes of the first and second rod-shaped members.

Advantageous Effects of Invention

The invention may provide a transfer apparatus capable of alleviating a stress that may be caused by heat expansion and contraction.

DESCRIPTION OF EMBODIMENTS

Figure 1:
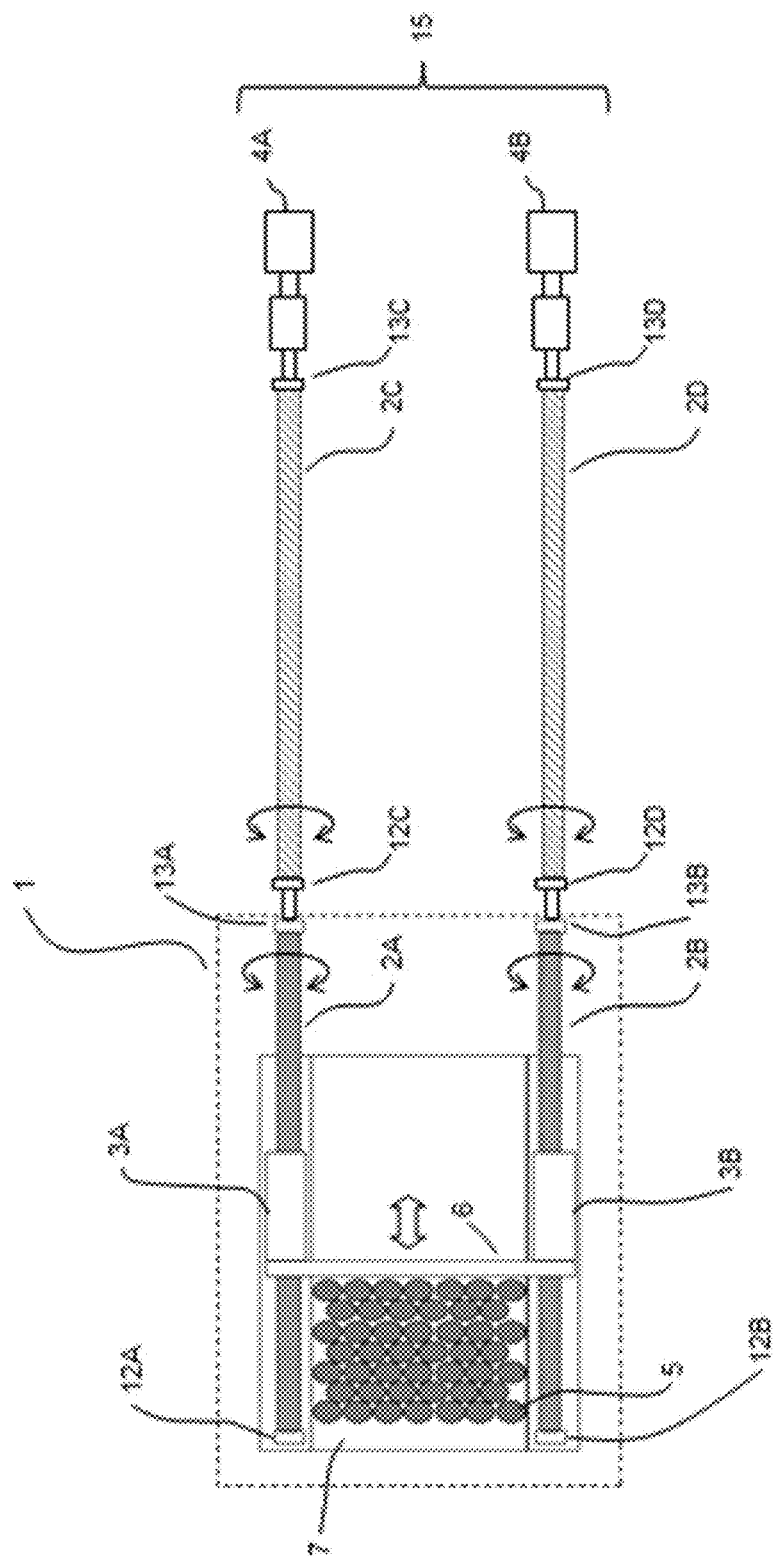
FIG. 1 is a schematic plan view illustrating a storage apparatus according to an embodiment of the invention.

Embodiments of the invention will be described below. In the description of the drawings given below, the same or similar parts are denoted by the same or similar reference numerals. However, the drawings are schematically illustrated. Therefore, specific dimensions and the like should be determined with reference to the following description. It will be appreciated that the relationship or ratio between dimensions may be different among the drawings.

The storage apparatus according to the embodiment of the invention comprises a storage housing 1 that stores articles 5 and a transfer apparatus 15 that transfers the articles 5, as illustrated in FIG. 1. The storage housing 1 is, for example, a temperature-controlled furnace having a temperature-controlled space that houses the articles 5. The temperature-controlled furnace is, for example, a freeze-drying furnace. For example, a shelf board 7 horizontally to the ground is disposed in the storage housing 1, and the articles 5 comprising an object to be freeze-dried are disposed on the shelf board 7. The articles 5 are, for example, vials containing a medicine poured therein.

Figure 2:
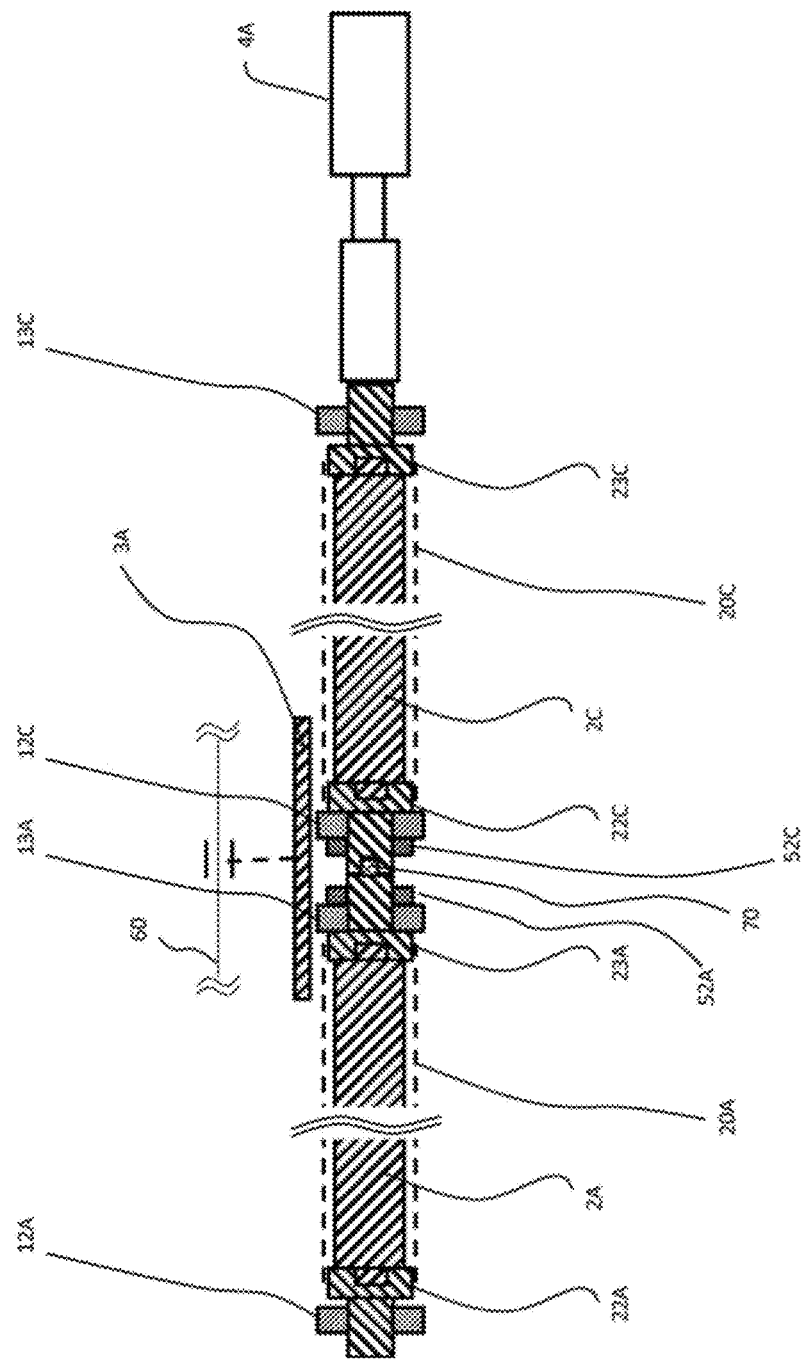
FIG. 2 is a schematic cross-sectional view illustrating a transfer apparatus according to the embodiment of the invention.

As illustrated in FIG. 2, the transfer apparatus 15 comprises a first rod-shaped member 2A comprising a magnetic material, a first cover 20A configured to cover the first rod-shaped member 2A, a first terminal member 22A configured to allow insertion of a first end portion of the first rod-shaped member 2A, and a second terminal member 23A configured to allow insertion of a second end portion of the first rod-shaped member 2A. The first rod-shaped member 2A and the first terminal member 22A are not fixed. However, the first rod-shaped member 2A and the second terminal member 23A are fixed to each other. The transfer apparatus 15 comprises a second rod-shaped member 2C comprising a magnetic material, a second cover 20C configured to cover the second rod-shaped member 2C, a third terminal member 22C configured to allow insertion of a first end portion of the second rod-shaped member 2C, and a fourth terminal member 23C configured to allow insertion of a second end portion of the second rod-shaped member 2C.

An outer diameter of the first rod-shaped member 2A and an outer diameter of the second rod-shaped member 2C are the same. The first rod-shaped member 2A and the second rod-shaped member 2C are disposed so that a central axis of the first rod-shaped member 2A and a central axis of the second rod-shaped member 2C are aligned on an identical line. The second terminal member 23A and the third terminal member 22C are coupled by a coupling member 70. The coupling member 70 may be configured to allow coupling and separation according to opening and closing of a door of the temperature-controlled furnace.

A driving device 4A is connected to the fourth terminal member 23C. When the driving device 4A causes the fourth terminal member 23C to rotate about the central axes of the first and second rod-shaped members 2A and 2C as an axis of rotation, the second rod-shaped member 2C, the third terminal member 22C, the second terminal member 23A, the first rod-shaped member 2A, and the first terminal member 22A rotate simultaneously. The transfer apparatus 15 further comprises an opposite member 3A that faces a part of side surfaces of the first and second rod-shaped members 2A and 2C and comprising a magnetic material as illustrated in FIG. 1. When the first and second rod-shaped members 2A and 2C rotate, the opposite member 3A moves along the central axes of the first and second rod-shaped members 2A and 2C.

The transfer apparatus 15 further comprises a first rod-shaped member 2B disposed in parallel to the first rod-shaped member 2A and a second rod-shaped member 2D disposed in parallel to the second rod-shaped member 2C. Although not illustrated in the drawing, in the same manner as the first rod-shaped member 2A, the first rod-shaped member 2B is covered with a first cover, and the first and second terminal members are inserted respectively into both ends of the first rod-shaped member 2B. The first rod-shaped member 2B and the first terminal member are not fixed. However, the first rod-shaped member 2B and the second terminal member are fixed to each other. In the same manner as the second rod-shaped member 2C, the second rod-shaped member 2D is covered with a second cover, and the third and fourth terminal members are inserted respectively into both ends of the second rod-shaped member 2D.

A driving device 4B is connected to a fourth terminal member. The second rod-shaped member 2D is inserted into the fourth terminal member. When the driving device 4B rotates the fourth terminal member about the central axes of the first and second rod-shaped members 2B and 2D as an axis of rotation, the second rod-shaped member 2D, the third terminal member, the second terminal member, the first rod-shaped member 2B, and the first terminal member rotate simultaneously.

In the following description, sides of the second rod-shaped members 2C and 2D connected to the driving devices 4A and 4B may be referred to as a driven side, sides of the second rod-shaped members 2C and 2D connected to the first rod-shaped members 2A and 2B may be referred to as a coupling side, sides of the first rod-shaped members 2A and 2B connected to the second rod-shaped members 2C and 2D may be referred to as a coupling side, and sides opposite to the coupling sides of the first rod-shaped members 2A and 2B may be referred to as a non-driven side.

The transfer apparatus 15 further comprises an opposite member 3B that faces a part of side surfaces of the first and second rod-shaped members 2B and 2D and comprising a magnetic material. When the first and second rod-shaped members 2B and 2D rotate, the opposite member 3B moves along the central axes of the first and second rod-shaped members 2B and 2D.

A contact member 6 is connected to the opposite members 3A and 3B. The contact member 6 moves following a change in relative position of the rod-shaped members 2A and 2B and the opposite member 3A and 3B. The contact member 6 makes contact with the articles 5 to move the articles 5.

The contact member 6 is disposed in a vertical direction with respect to the central axes of the first and second rod-shaped members 2A and 2C.

For example, the first rod-shaped members 2A and 2B are disposed inside the storage housing 1 having a significant temperature change. The second rod-shaped members 2C and 2D and the driving devices 4A and 4B are disposed in a space outside the storage housing 1.

Figure 3:
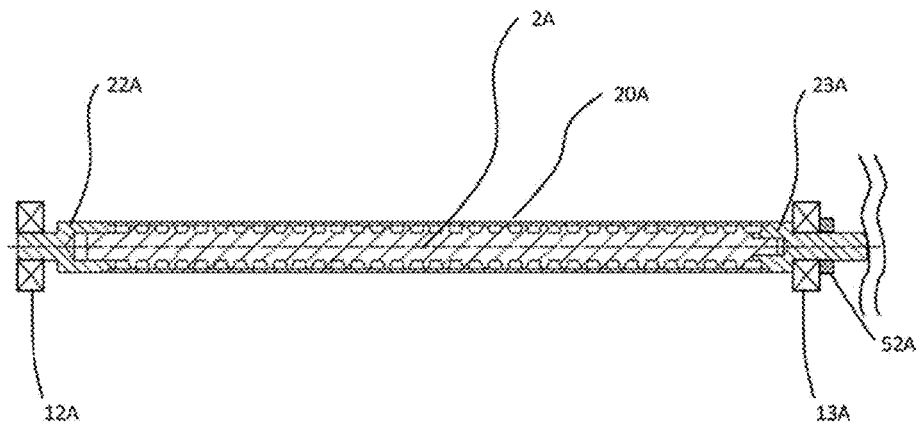
FIG. 3 is a schematic cross-sectional view illustrating a first rod-shaped member according to the embodiment of the invention.
Figure 4:
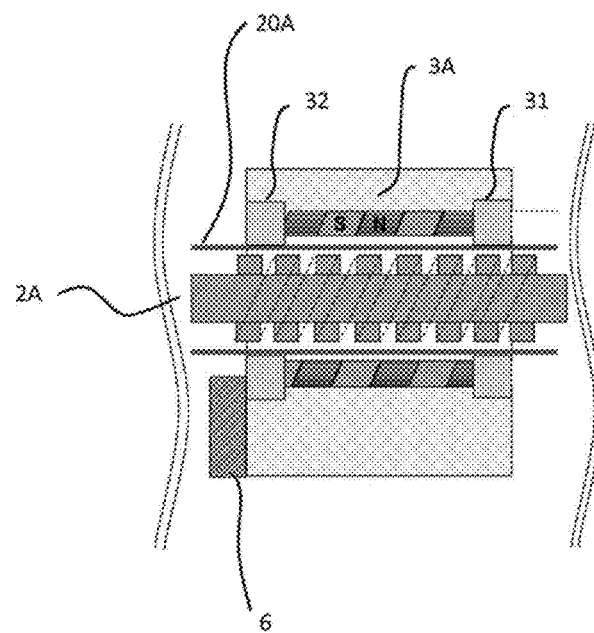
FIG. 4 is a schematic cross-sectional view illustrating the first rod-shaped member and an opposite member according to the embodiment of the invention.
Figure 5:
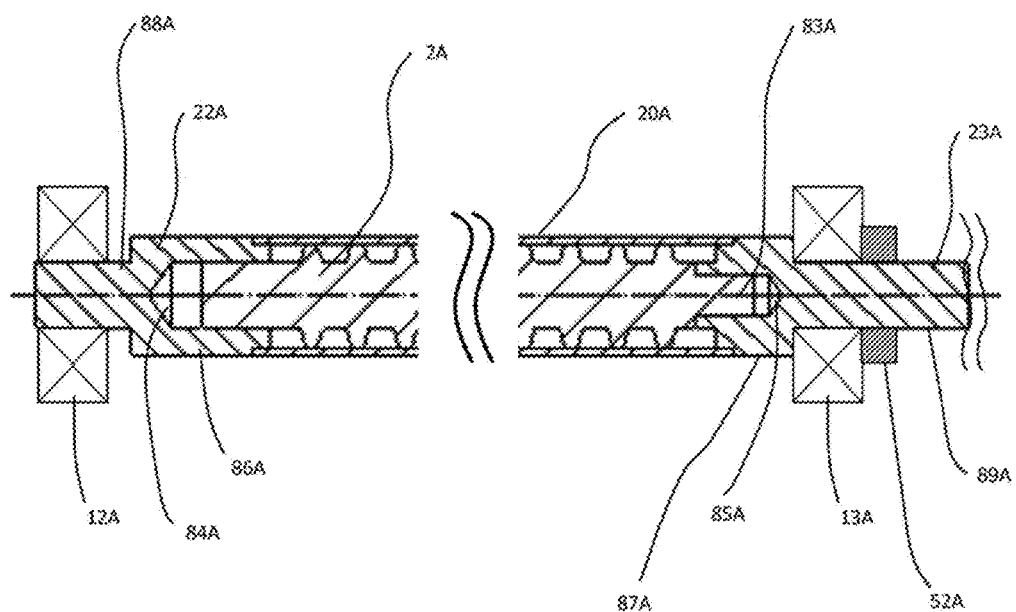
FIG. 5 is a schematic cross-sectional view illustrating the first rod-shaped member according to the embodiment of the invention.

As illustrated in FIG. 3 and FIG. 4, the first rod-shaped member 2A is a magnetic screw comprising a magnetic material, and the outer peripheral surface thereof is threaded in a spiral shape. As illustrated in FIG. 5, a second end portion of the first rod-shaped member 2A is provided with a projection 83A. An outer shape of the projection 83A is a circle and has an outer periphery smaller than the outer diameter of the main body of the first rod-shaped member 2A. The central axis of the projection 83A is aligned with the central axis of the main body of the first rod-shaped member 2A. The first cover 20A is, for example, a thin-walled pipe of a nonmagnetic material made of stainless steel, aluminum, resin, or the like. The first rod-shaped member 2A is inserted into the first cover 20A having a cylindrical shape. The central axis of the first rod-shaped member 2A is aligned with the central axis of the first cover 20A. When the first rod-shaped member 2A rotates, the first cover 20A also rotates about the central axis of the first rod-shaped member 2A.

The first terminal member 22A has a concave portion 84A therein and comprises an engagement portion 86A having a part with an outer diameter identical to that of the first cover 20A and a mandrel portion 88A having a shape of a projection with an outer diameter smaller than an outer diameter of the engagement portion 86A. The engagement portion 86A and the mandrel portion 88A are integrated with each other. The outer shapes of the engagement portion 86A and the mandrel portion 88A are circles and the center of the outer shape of the engagement portion 86A and the center of the outer shape of the mandrel portion 88A are aligned on an identical line. The first terminal member 22A is made of a nonmagnetic material such as stainless steel, aluminum, or resin.

The concave portion 84A of the first terminal member 22A has a circular cross section and has an inner diameter identical to an outer diameter of the first end portion of the first rod-shaped member 2A. The first end portion of the first rod-shaped member 2A is inserted into the concave portion 84A of the first terminal member 22A. Here, an insertion depth of the first end portion of the first rod-shaped member 2A is smaller than the depth of the concave portion 84A of the first terminal member 22A. Accordingly, a space is provided between an end surface of the first end portion of the first rod-shaped member 2A and a bottom surface of the concave portion 84A. In addition, the end surface surrounding the concave portion 84A of the first terminal member 22A does not make contact with the first rod-shaped member 2A. Here, the end surface is a surface orthogonal to the central axis of the first rod-shaped member 2A and the same applies to the following description.

In addition, the engagement portion 86A of the first terminal member 22A is provided with a step having a height identical to the thickness of the first cover 20A. The outer shape of the step portion is also a circle. An outer diameter of the part of the engagement portion 86A reduced in diameter by the step is identical to the inner diameter of the first cover 20A. The outer diameter of the part of the engagement portion 86A increased in diameter by the step is identical to the outer diameter of the first cover 20A. The part of the engagement portion 86A of the first terminal member 22A reduced in diameter by the step is inserted inside the first cover 20A.

The second terminal member 23A has a concave portion 85A therein and comprises an engagement portion 87A having a part with an outer diameter identical to the outer diameter of the first cover 20A and a mandrel portion 89A having a shape of a projection with an outer diameter smaller than the outer diameter of the engagement portion 87A. The engagement portion 87A and the mandrel portion 89A are integrated with each other. The outer shapes of the engagement portion 87A and the mandrel portion 89A are circles and the center of the outer shape of the engagement portion 87A and the center of the outer shape of the mandrel portion 89A are aligned on an identical line. The second terminal member 23A is made of a nonmagnetic material such as stainless steel, aluminum, resin or the like.

The concave portion 85A of the second terminal member 23A has a circular cross section and has an inner diameter identical to the outer diameter of the projection 83A at the second end portion of the first rod-shaped member 2A. The projection 83A of the second end portion of the first rod-shaped member 2A is inserted into the concave portion 85A of the second terminal member 23A. Here, an insertion depth of the projection 83A of the second end portion of the first rod-shaped member 2A is smaller than the depth of the concave portion 85A of the second terminal member 23A. Therefore, a space is provided between the end surface of the projection 83A of the first rod-shaped member 2A and the bottom surface of the concave portion 85A of the second terminal member 23A.

In addition, the engagement portion 87A of the second terminal member 23A is provided with a step having a height identical to the thickness of the first cover 20A. The outer shape of the step portion is a circle. The outer diameter of the part of the engagement portion 87A reduced in diameter by the step is identical to the inner diameter of the first cover 20A. The outer diameter of the part of the engagement portion 87A increased in diameter by the step is identical to the outer diameter of the first cover 20A. The part of the engagement portion 87A of the second terminal member 23A reduced in diameter by the step is inserted inside the first cover 20A.

For example, the mandrel portion 89A of the second terminal member 23A penetrates through a hole provided in a side wall of the storage housing 1 illustrated in FIG. 1. The hole of the side wall of the storage housing 1 configured to allow the mandrel portion 89A to pass through is provided with a sealing member such as an oil seal.

The transfer apparatus 15 further comprises a first bearing 12A that receives a load of the mandrel portion 88A of the first terminal member 22A and a second bearing 13A that receives a load of the mandrel portion 89A of the second terminal member 23A as illustrated in FIG. 5. The first bearing 12A and the second bearing 13A are disposed in the storage housing 1 illustrated in FIG. 1, for example. As illustrated in FIG. 5, on the coupling side, the second bearing 13A is tightened by a bearing nut 52A so that an end surface of the second terminal member 23A formed by the step between the engagement portion 87A and the mandrel portion 89A makes contact with the end surface of the second bearing 13A. This prevents or reduces misalignment caused by expansion and contraction in a direction of a central axis of the first rod-shaped member 2A on the coupling side.

In contrast, on the non-driven side, a space is provided between the end surface of the first terminal member 22A formed by a step between the engagement portion 86A and the mandrel portion 88A and the end surface of the first bearing 12A, and the first bearing 12A is not tightened by a bearing nut. This allows the first rod-shaped member 2A to expand and contract in the direction of the central axis on the non-driven side.

Figure 6:
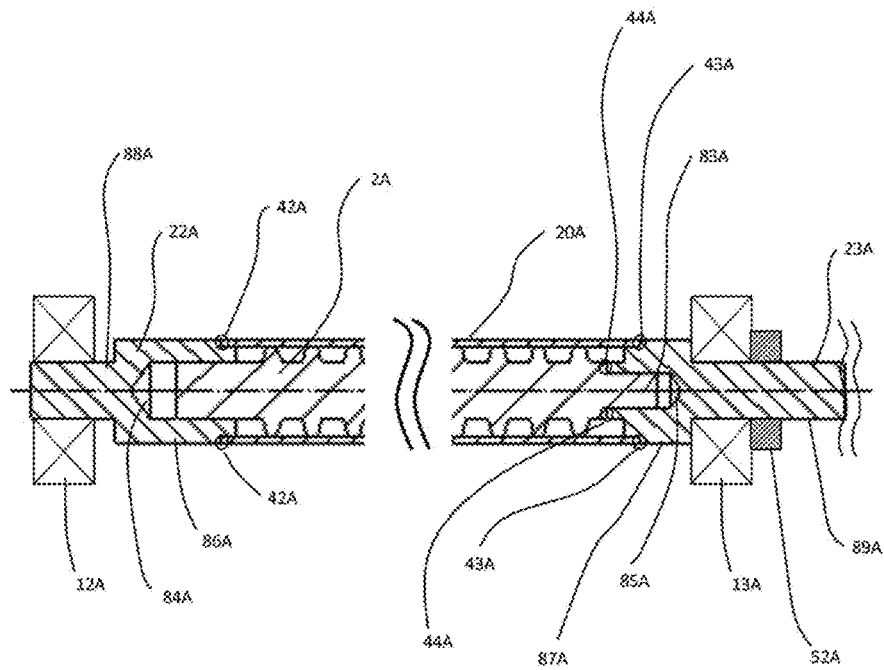
FIG. 6 is a schematic cross-sectional view illustrating the first rod-shaped member according to the embodiment of the invention.

As illustrated in FIG. 6, on the coupling side, a portion 43A at a point of contact between the end portion of the first cover 20A and the step portion of the engagement portion 87A of the second terminal member 23A is fixed by welding. In addition, on the coupling side, a portion 44A at a point of contact between the end surface of the first rod-shaped member 2A formed by the step between the main body and the projection 83A and the end surface surrounding the concave portion 85A of the engagement portion 87A of the second terminal member 23A is fixed by welding. Since the end surfaces are fixed to each other on the coupling side, misalignment of the first rod-shaped member 2A due to expand and contract in the direction of the central axis is prevented or reduced.

In contrast, on the non-driven side, a portion 42A at a point of contact between the end portion of the first cover 20A and the step portion of the engagement portion 86A of the first terminal member 22A is fixed by welding. However, on the non-driven side, the first end portion of the first rod-shaped member 2A and the first terminal member 22A are not fixed to each other by welding or the like and the first rod-shaped member 2A and the first terminal member 22A are integrated with each other only by a friction force. In addition, there is no portion corresponding to a point of contact between the end surface of the first rod-shaped member 2A and the end surface of the first terminal member 22A. Accordingly, on the non-driven side, the first rod-shaped member 2A is allowed to expand and contract in the direction of the central axis.

Figure 7:
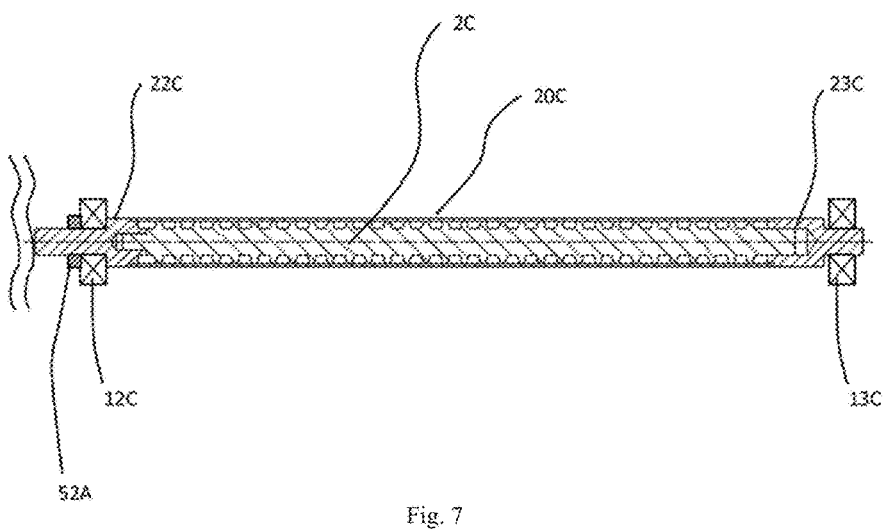
FIG. 7 is a schematic cross-sectional view illustrating a second rod-shaped member according to the embodiment of the invention.
Figure 8:
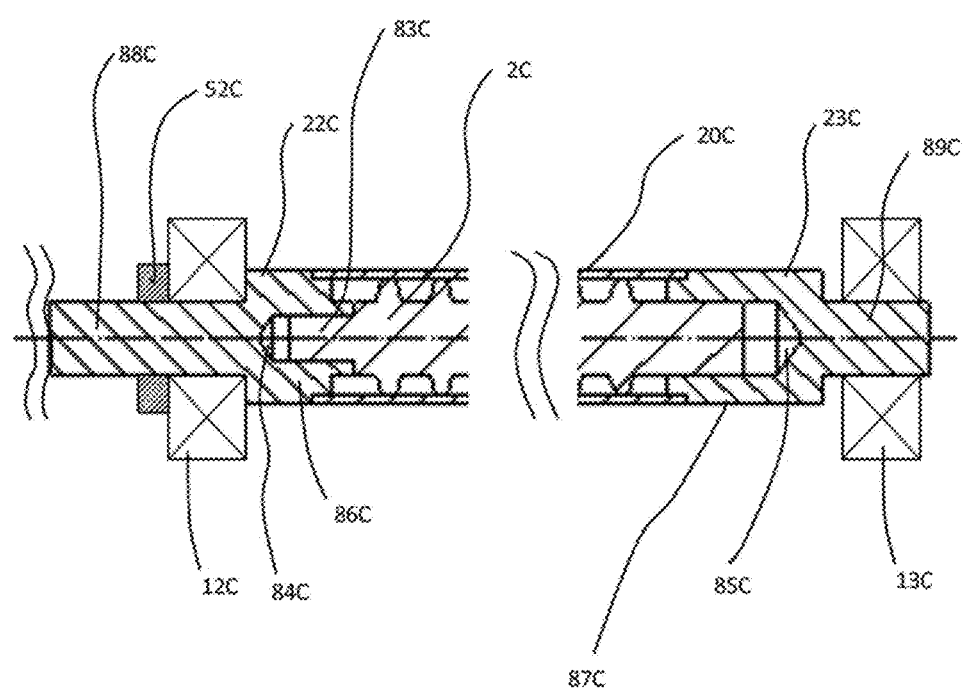
FIG. 8 is a schematic cross-sectional view illustrating the second rod-shaped member according to the embodiment of the invention.

As illustrated in FIG. 7, the second rod-shaped member 2C is a magnetic screw comprising a magnetic material and is provided with a thread in a spiral shape on an outer peripheral surface. As illustrated in FIG. 8, a first end portion of the second rod-shaped member 2C is provided with a projection 83C. The outer shape of the projection 83C is a circle and has an outer periphery smaller than the outer diameter of a main body of the second rod-shaped member 2C. The central axis of the projection 83C is aligned with the central axis of the main body of the second rod-shaped member 2C. The second cover 20C is, for example, a thin-walled pipe of a nonmagnetic material made of stainless steel, aluminum, resin, or the like. The second rod-shaped member 2C is inserted into the second cover 20C having a cylindrical shape. The central axis of the second rod-shaped member 2C is aligned with the central axis of the second cover 20C. When the second rod-shaped member 2C rotates, the second cover 20C also rotates about the central axis of the second rod-shaped member 2C.

The third terminal member 22C has a concave portion 84C therein and comprises an engagement portion 86C having a part with an outer diameter identical to the outer diameter of the second cover 20C and a mandrel portion 88C having a shape of a projection with an outer diameter smaller than the outer diameter of the engagement portion 86C. The engagement portion 86C and the mandrel portion 88C are integrated with each other. The outer shapes of the engagement portion 86C and the mandrel portion 88C are circles and the center of the outer shape of the engagement portion 86C and the center of the outer shape of the mandrel portion 88C are aligned on an identical line. The third terminal member 22C is made of a nonmagnetic material such as stainless steel, aluminum, or resin.

The concave portion 84C of the third terminal member 22C has a circular cross section and has an inner diameter identical to the outer diameter of the projection 83C of the first end portion of the second rod-shaped member 2C. The projection 83C of the first end portion of the second rod-shaped member 2C is inserted into the concave portion 84C of the third terminal member 22C. Here, an insertion depth of the projection 83C at the first end portion of the second rod-shaped member 2C is smaller than the depth of the concave portion 84C of the third terminal member 22C. Therefore, a space is provided between the end surface of the projection 83C of the second rod-shaped member 2C and a bottom surface of the concave portion 84C of the third terminal member 22C.

In addition, the engagement portion 86C of the third terminal member 22C is provided with a step having the height identical to the thickness of the second cover 20C. The outer shape of the step portion is a circle. The outer diameter of the part of the engagement portion 86C reduced in diameter by the step is identical to the inner diameter of the second cover 20C. The outer diameter of the part of the engagement portion 86C increased in diameter by the step is identical to the outer diameter of the second cover 20C. The part of the engagement portion 86C of the third terminal member 22C reduced in diameter by the step is inserted inside the second cover 20C.

The fourth terminal member 23C has a concave portion 85C therein and comprises an engagement portion 87C having a part with an outer diameter identical to the outer diameter of the second cover 20C and a mandrel portion 89C having a shape of a projection with an outer diameter smaller than in the engagement portion 87C. The engagement portion 87C and the mandrel portion 89C are integrated with each other. The outer shapes of the engagement portion 87C and the mandrel portion 89C are circles and the center of the outer shape of the engagement portion 87C and the center of the outer shape of the mandrel portion 89C are aligned on an identical line. The fourth terminal member 23C is made of a nonmagnetic material such as stainless steel, aluminum, resin or the like.

The concave portion 85C of the fourth terminal member 23C has a circular cross section and has an inner diameter identical to the outer diameter of the second end portion of the second rod-shaped member 2C. The second end portion of the second rod-shaped member 2C is inserted into the concave portion 85C of the fourth terminal member 23C. Here, an insertion depth of the second end portion of the second rod-shaped member 2C is smaller than the depth of the concave portion 85C of the fourth terminal member 23C. Accordingly, a space is provided between an end surface of the second end portion of the second rod-shaped member 2C and the bottom surface of the concave portion 85C. In addition, the end surface surrounding the concave portion 85C of the fourth terminal member 23C does not make contact with the second rod-shaped member 2C.

In addition, the engagement portion 87C of the fourth terminal member 23C is provided with a step having the height identical to the thickness of the second cover 20C. The outer shape of the step portion is also a circle. The outer diameter of the part of the engagement portion 87C reduced in diameter by the step is identical to the inner diameter of the second cover 20C. The outer diameter of the part of the engagement portion 87C increased in diameter by the step is identical to the outer diameter of the second cover 20C. The part of the engagement portion 87C of the fourth terminal member 23C reduced in diameter by the step is inserted inside the second cover 20C.

The transfer apparatus 15 further comprises a third bearing 12C that receives a load of the mandrel portion 88C of the third terminal member 22C and a fourth bearing 13C that receives a load of the mandrel portion 89C of the fourth terminal member 23C. On the coupling side, the third bearing 12C is tightened by a bearing nut 52C so that an end surface formed by the engagement portion 86C of the third terminal member 22C and a step of the mandrel portion 88C makes contact with an end surface of the third bearing 12C. This prevents or reduces misalignment caused by expansion and contraction in a direction of a central axis of the second rod-shaped member 2C on the coupling side.

In contrast, on the driven side, a space is provided between the end surface of the fourth terminal member 23C formed by a step between the engagement portion 87C and the mandrel portion 89C and the end surface of the fourth bearing 13C, and the fourth bearing 13C is not tightened by the bearing nut. This allows the second rod-shaped member 2C to expand and contract in the direction of the central axis on the driven side.

Figure 9:
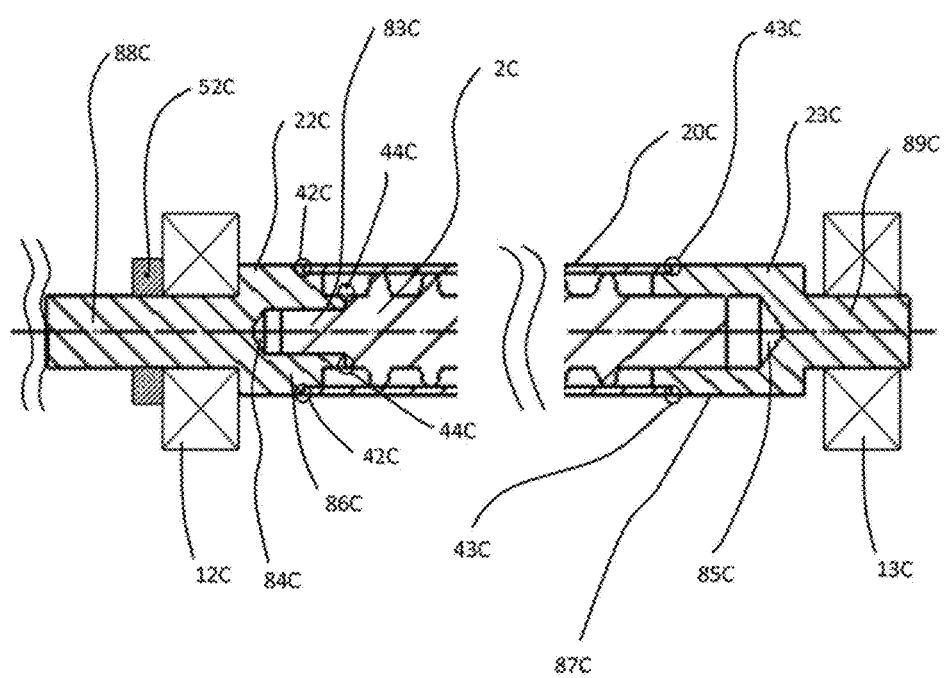
FIG. 9 is a schematic cross-sectional view illustrating the second rod-shaped member according to the embodiment of the invention.

As illustrated in FIG. 9, on the coupling side, a portion 42C at a point of contact between the end portion of the second cover 20C and the step portion of the engagement portion 86C of the third terminal member 22C is fixed by welding. In addition, on the coupling side, a portion 44C at a point of contact between the end surface of the second rod-shaped member 2C formed by the step between the main body and the projection 83C of the second rod-shaped member 2C and the end surface surrounding the concave portion 84C of the engagement portion 86C of the third terminal member 22C is fixed by welding. Since the end surfaces are fixed on the coupling side, misalignment of the second rod-shaped member 2C in the direction of the central axis caused by expansion and contraction is prevented or reduced.

In contrast, on the driven side, a portion 43C at a point of contact between the end portion of the second cover 20C and the step portion of the engagement portion 87C of the fourth terminal member 23C is fixed by welding. However, on the driven side, the second end portion of the second rod-shaped member 2C and the fourth terminal member 23C are not fixed to each other by welding or the like and the second rod-shaped member 2C and the fourth terminal member 23C are integrated with each other only by a friction force. In addition, there is no portion corresponding to a point of contact between the end surface of the second rod-shaped member 2C and the end surface of the fourth terminal member 23C. Accordingly, on the driven side, the second rod-shaped member 2C is allowed to expand and contract in the direction of the central axis.

The opposite member 3A illustrated in FIG. 1 is a magnetic nut comprising a magnetic material and provided with a hole having an inner circumference larger than outer circumferences of the first and second rod-shaped members 2A and 2C. The first and second rod-shaped members 2A and 2C penetrate through a hole in the opposite member 3A having a nut shape. As illustrated in FIG. 2, the opposite member 3A may be supported by a guide 60. As illustrated in FIG. 4, S pole magnetized zones and N pole magnetized zones are alternately provided in a spiral shape on an inner peripheral surface of the hole in the opposite member 3A. The pitch of the magnetized zones of the opposite member 3A is substantially identical to the pitch of the threads of the first and second rod-shaped members 2A and 2C. Guide rings 31 and 32 such as bushes may be provided on the inner peripheral surface of the opposite member 3A. The inner circumferences of the guide rings 31 and 32 are smaller than the inner circumference of the opposite member 3A and make contact with the outer peripheral surface of the first and second covers 20A and 20C. Therefore, a constant interval is kept between the threads of the first and second rod-shaped members 2A and 2C and the magnetized zones of the opposite member 3A. The guide rings 31 and 32 are made of a material having a small friction coefficient, such as fluororesin.

The first rod-shaped member 2A and the second rod-shaped member 2C illustrated in FIG. 2 are connected in such a manner that the thread pitch of an extended screw shaft matches the screw pitch of the second rod-shaped member 2C and does not cause any misalignment even when the screw shaft of the first rod-shaped member 2A is extended. Accordingly, the opposite member 3A is allowed to move smoothly from the first rod-shaped member 2A to the second rod-shaped member 2C, or from the second rod-shaped member 2C to the first rod-shaped member 2A at a coupling portion between the first rod-shaped member 2A and the second rod-shaped member 2C.

As illustrated in FIG. 1, the first rod-shaped member 2B is held by a first bearing 12B and a second bearing 13B in parallel with the first rod-shaped member 2A in the storage housing 1. The second rod-shaped member 2D is held by a third bearing 12D and a fourth bearing 13D in parallel with the second rod-shaped member 2C. A configuration of the opposite member 3B is identical to that of the opposite member 3A. The contact member 6 is a plate member and is fixed between the opposite member 3A and the opposite member 3B so as to be substantially orthogonal to the surface of the shelf board 7.

The driving devices 4A and 4B comprise, for example, rotating motors, and are disposed outside a temperature controlled space in the storage housing 1. The driving devices 4A and 4B may be covered with a shield or the like which prevents diffusion of possible dust or the like. The driving device 4A and the second rod-shaped member 2C are connected, for example, via the mandrel portion 89C of the fourth terminal member 23C illustrated in FIG. 9. Likewise, the driving device 4B and the second rod-shaped member 2D illustrated in FIG. 1 are connected via a mandrel portion of the fourth terminal member with the second rod-shaped member 2D inserted.

The driving devices 4A and 4B rotate the first and second rod-shaped members 2A, 2B, 2C, and 2D in synchronization with each other. When the driving device 4A rotates the first and second rod-shaped members 2A and 2C, a magnetic force acts between the threads of the first and second rod-shaped members 2A and 2C and the magnetized zones of the opposite member 3A. The opposite member 3A is fixed to the contact member 6 and the opposite member 3B and cannot rotate. Therefore, when the first and second rod-shaped members 2A and 2C rotate, the opposite member 3A moves along the central axes of the first and second rod-shaped members 2A and 2C.

In addition, when the driving device 4B rotates the first and second rod-shaped members 2B and 2D, a magnetic force acts between the threads of the first and second rod-shaped members 2B and 2D and the magnetized zones of the opposite member 3B, and the opposite member 3B moves along the central axis of the first and second rod-shaped members 2B and 2D. The contact member 6 fixed between the opposite members 3A and 3B also moves along the central axes of the first and second rod-shaped members 2A, 2B, 2C, and 2D on the shelf board 7 as the opposite members 3A and 3B move. The articles 5 placed on the shelf board 7 are pushed by the contact member 6 and move on the shelf board 7. Furthermore, the articles 5 may be pushed to the outside of the storage housing 1 through the door of the storage housing 1.

In the transfer apparatus 15 according to the embodiment described above, the heat expansion ratio of the first rod-shaped member 2A comprising a magnetic material illustrated in FIG. 6 is different from the heat expansion ratios of the first cover 20A, the first terminal member 22A, and the second terminal member 23A that are made of a nonmagnetic material. However, since the rod-shaped member 2A is allowed to expand and contract on the non-driven side, a stress that may be caused by differences in heat expansion ratios may be alleviated.

In addition, as described above, the first rod-shaped member 2A and the second rod-shaped member 2C illustrated in FIG. 2 are connected in such a manner that the thread pitch of an extended screw shaft matches the screw pitch of the second rod-shaped member 2C and does not cause any misalignment even when the screw shaft of the first rod-shaped member 2A is extended. However, on the coupling side, if expansion and contraction of the first rod-shaped member 2A are allowed, the space between the first rod-shaped member 2A and the second rod-shaped member 2C may vary. Therefore, on the coupling side, if the expansion and contraction of the first rod-shaped member 2A are allowed, the thread pitch of the extended screw shaft and the screw pitch of the second rod-shaped member 2C may be misaligned even when the screw shaft of the first rod-shaped member 2A is extended, and thus the opposite member 3A may have a difficulty to move smoothly at a coupling portion between the first rod-shaped member 2A and the second rod-shaped member 2C.

In contrast, as illustrated in FIG. 6, by fixing the first rod-shaped member 2A, the first cover 20A, and the first terminal member 22A by welding, misalignment caused by the expansion and contraction of the first rod-shaped member 2A may be avoided on the coupling side, and the smooth movement of the opposite member 3A at the coupling portion may be maintained. The same applies to the first rod-shaped member 2B illustrated in FIG. 1.

The heat expansion ratio of the second rod-shaped member 2C comprising a magnetic material illustrated in FIG. 9 is different from the heat expansion ratios of the second cover 20C, the third terminal member 22C, and the fourth terminal member 23C that are made of a nonmagnetic material. However, since the second rod-shaped member 2C is allowed to expand and contract on the driven side, a stress that may be caused by difference in heat expansion ratios may be alleviated.

Furthermore, by fixing the second rod-shaped member 2C, the second cover 20C, and the third terminal member 22C by welding, misalignment caused by the expansion and contraction of the second rod-shaped member 2C may be avoided on the coupling side, and the smooth movement of the opposite member 3A at the coupling portion may be maintained. The same applies to the second rod-shaped member 2D illustrated in FIG. 1.

In the storage apparatus according to the embodiment described above, the driving torque is transmitted between the first and second rod-shaped members 2A and 2C and the opposite member 3A, and between the first and second rod-shaped members 2B and 2D and the opposite member 3B in a non-contact manner by a magnetic force. Therefore, generation of heat and dust is reduced during driving force transmission between the first and second rod-shaped members 2A and 2C and the opposite member 3A, and between the first and second rod-shaped members 2B and 2D and the opposite member 3B. Accordingly, even if the opposite members 3A and 3B move in the temperature-controlled space in the storage housing 1, an influence of heat generation in the temperature-controlled space may be prevented or reduced and the temperature-controlled space may be kept clean.

In addition, since the driving devices 4A and 4B are disposed outside the temperature-controlled space in the storage housing 1, even if dust is generated in the driving devices 4A and 4B, the dust is unlikely to enter the temperature-controlled space in the storage housing 1. If the driving devices are disposed in the temperature-controlled furnace, the temperature distribution may become uneven in the temperature-controlled furnace such as a freeze drying furnace due to the heated driving devices. In this case, the quality of multiple articles disposed in the temperature-controlled furnace may become uneven. In contrast, in the storage apparatus according to the embodiment, since the driving devices 4A and 4B are disposed outside the temperature-controlled space in the storage housing 1, the temperature is unlikely to become uneven in the storage housing 1.

In FIG. 1, an example in which the first rod-shaped members 2A and 2B are disposed in the interior of the storage housing 1, and the second rod-shaped members 2C and 2D are disposed outside the storage housing 1 has been described. However, the second rod-shaped members 2C and 2D may also be provided inside the storage housing 1.

(First Modification)

FIG. 1 illustrates an example in which the driving devices 4A and 4B are connected to the fourth terminal member configured to allow insertion of the second end portions of the second rod-shaped members 2C and 2D. In contrast, the driving devices 4A and 4B may be connected to the first terminal member that allows insertion of the first rod-shaped members 2A and 2B.

(Second Modification)

FIG. 9 illustrates an example in which the second end portion of the second rod-shaped member 2C and the fourth terminal member 23C are not fixed on the driven side, and thus is allowed to be expanded and contracted in a direction of the central axis of the second rod-shaped member 2C. However, the space where the second rod-shaped member 2C is disposed is a space having less temperature change, and if expansion and contraction of the second rod-shaped member 2C can hardly occur, the second end portion of the second rod-shaped member 2C and the fourth terminal member 23C may be fixed. The same applies to the second rod-shaped member 2D illustrated in FIG. 1.

(Third Modification)

Figure 10:
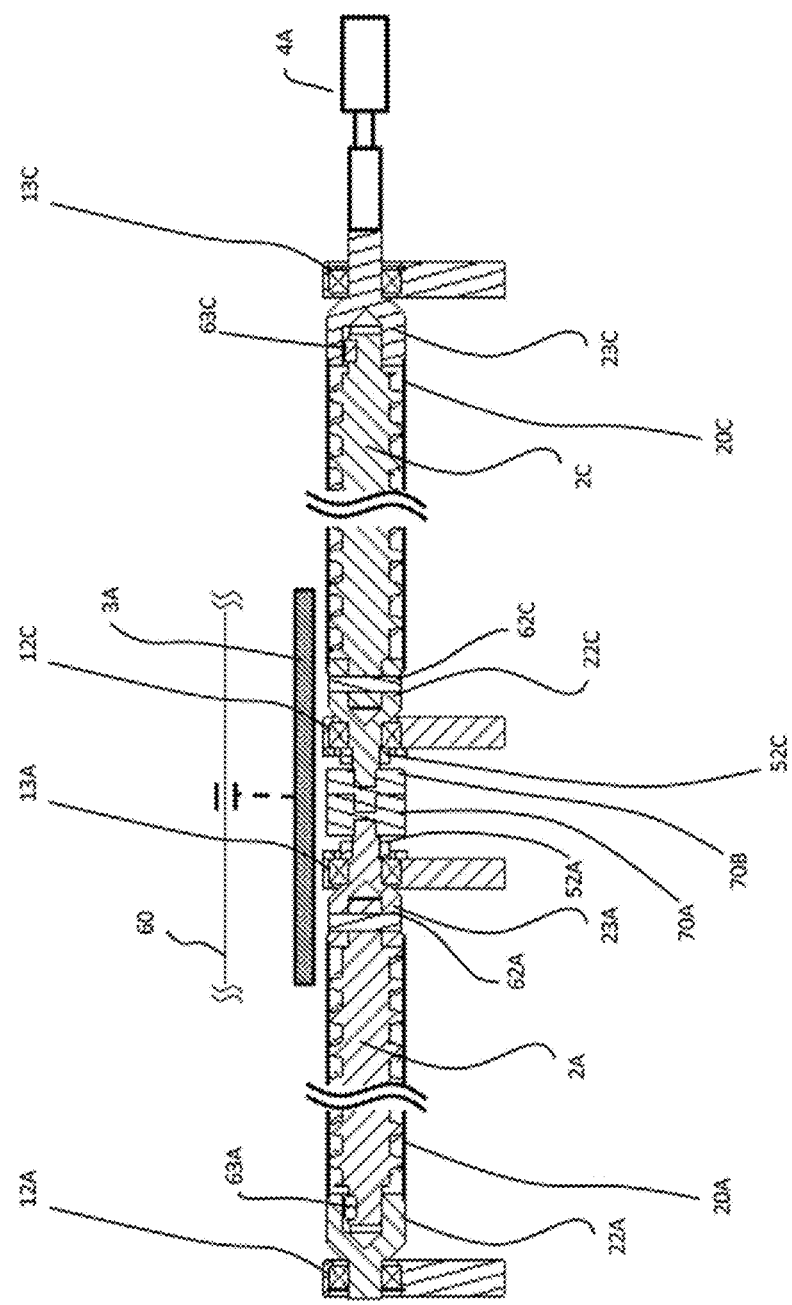
FIG. 10 is a schematic cross-sectional view illustrating a transfer apparatus according to a third modification of the embodiment of the invention.
Figure 11:
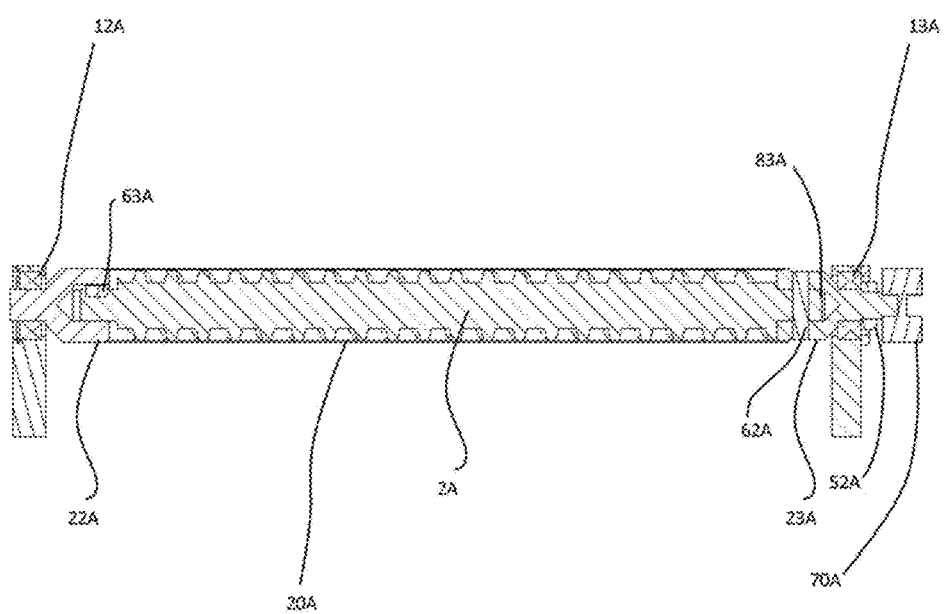
FIG. 11 is a schematic cross-sectional view illustrating a first rod-shaped member according to the third modification of the embodiment of the invention.
Figure 12:
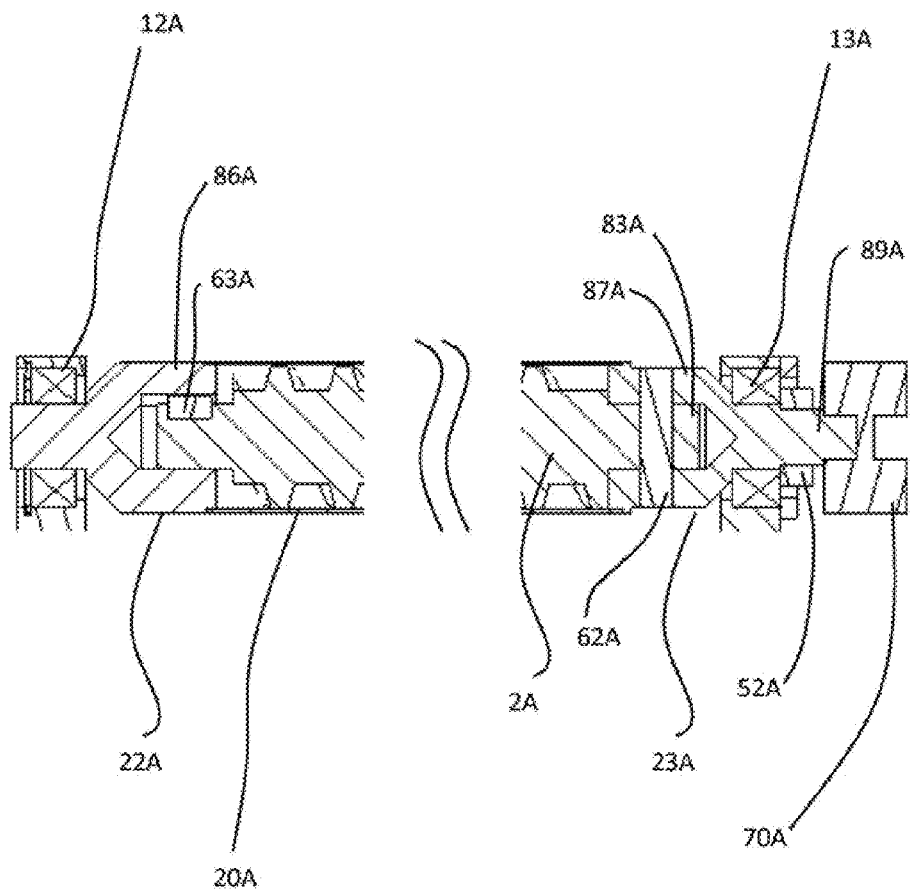
FIG. 12 is a schematic cross-sectional view illustrating the first rod-shaped member according to the third modification of the embodiment of the invention.

Although FIG. 6 illustrates an example in which the portion 44A at a point of contact between the first rod-shaped member 2A and the engagement portion 87A of the second terminal member 23A is fixed by welding on the coupling side, the fixation method is not limited to welding. For example, as illustrated in FIG. 10 and FIG. 11, the first rod-shaped member 2A and the second terminal member 23A may be fixed to each other by a fastening pin 62A on the coupling side. As illustrated in FIG. 12, a through-hole is provided in the projection 83A of the second end portion of the first rod-shaped member 2A, and a through-hole is also provided in the engagement portion 87A of the second terminal member 23A. The fastening pin 62A is then inserted so as to penetrate both through the through-hole in the projection 83A of the first rod-shaped member 2A and the through-hole in the engagement portion 87A of the second terminal member 23A to prevent or reduce expansion and contraction of the first rod-shaped member 2A in the direction of the central axis. In this case as well, a portion at a point of contact between the first cover 20A and the engagement portion 87A of the second terminal member 23A may be fixed by welding on the coupling side.

In addition, as illustrated in FIG. 10 and FIG. 11, the first rod-shaped member 2A and the first terminal member 22A may make contact with each other via a key 63A on the non-driven side. For example, as illustrated in FIG. 12, the key 63A is fitted into a key groove provided in the first end portion of the first rod-shaped member 2A. On the non-driven side, although the key 63A suppresses slippage of the first terminal member 22A when the first rod-shaped member 2A rotates, the key 63A allows the first rod-shaped member 2A to expand and contract in the direction of the central axis. In this case as well, a portion at a point of contact between the first cover 20A and the engagement portion 86A of the first terminal member 22A may be fixed by welding on the non-driven side.

Figure 13:
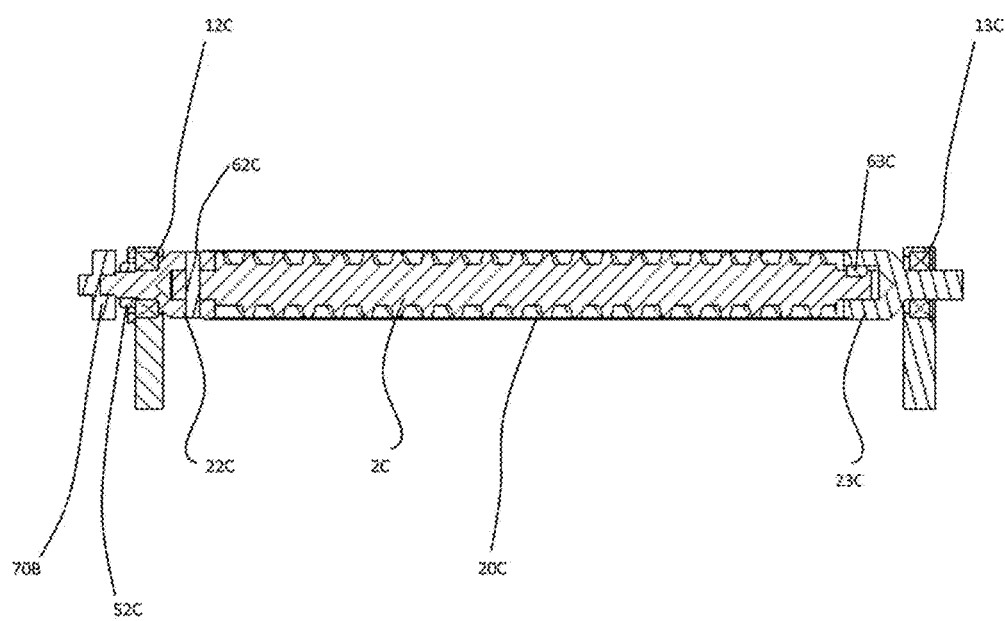
FIG. 13 is a schematic cross-sectional view illustrating a second rod-shaped member according to the third modification of the embodiment of the invention.
Figure 14:
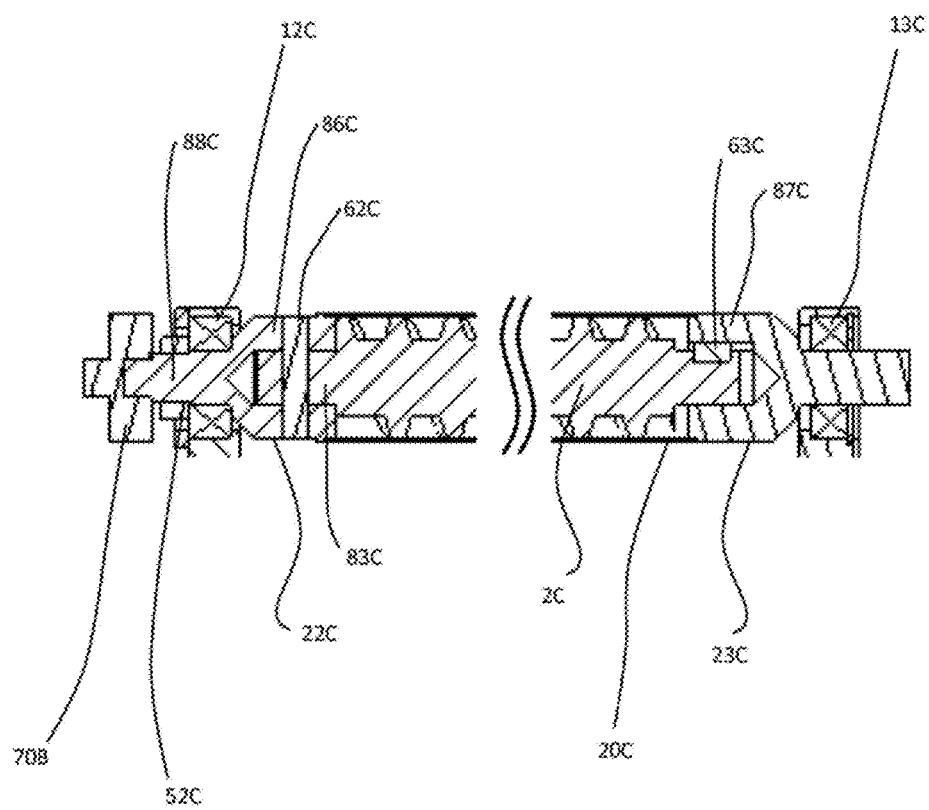
FIG. 14 is a schematic cross-sectional view illustrating the second rod-shaped member according to the third modification of the embodiment of the invention.

In addition, in conjunction with FIG. 9, an example in which the portion 44C at a point of contact between the second rod-shaped member 2C and the engagement portion 86C of the third terminal member 22C on the coupling side is fixed by welding has been described. However, for example, as illustrated in FIG. 10 and FIG. 13, the second rod-shaped member 2C and the third terminal member 22C may be fixed by a fastening pin 62C on the coupling side. As illustrated in FIG. 14, a through-hole is provided in the projection 83C of the first end portion of the second rod-shaped member 2C, a through-hole is also provided in the engagement portion 86C of the third terminal member 22C. The fastening pin 62C is then inserted so as to penetrate both through the through-hole in the projection 83C of the second rod-shaped member 2C and the through-hole in the engagement portion 86C of the third terminal member 22C to prevent or reduce expansion and contraction of the second rod-shaped member 2C in the direction of the central axis. In this case as well, a portion at a point of contact between the second cover 20C and the engagement portion 86C of the third terminal member 22C may be fixed by welding on the coupling side.

In addition, as illustrated in FIG. 10 and FIG. 13, the second rod-shaped member 2C and the fourth terminal member 23C may make contact with each other via a key 63C on the driven side. For example, as illustrated in FIG. 14, the key 63C is fitted into a key groove provided in the second end portion of the second rod-shaped member 2C. On the driven side, although the key 63C prevents or reduces slippage of the second rod-shaped member 2C when the fourth terminal member 23C rotates, the key 63C allows the second rod-shaped member 2C to expand and contract in the direction of the central axis. In this case as well, a portion at a point of contact between the second cover 20C and the engagement portion 87C of the fourth terminal member 23C may be fixed by welding on the driven side.

(Fourth Modification)

Figure 15:
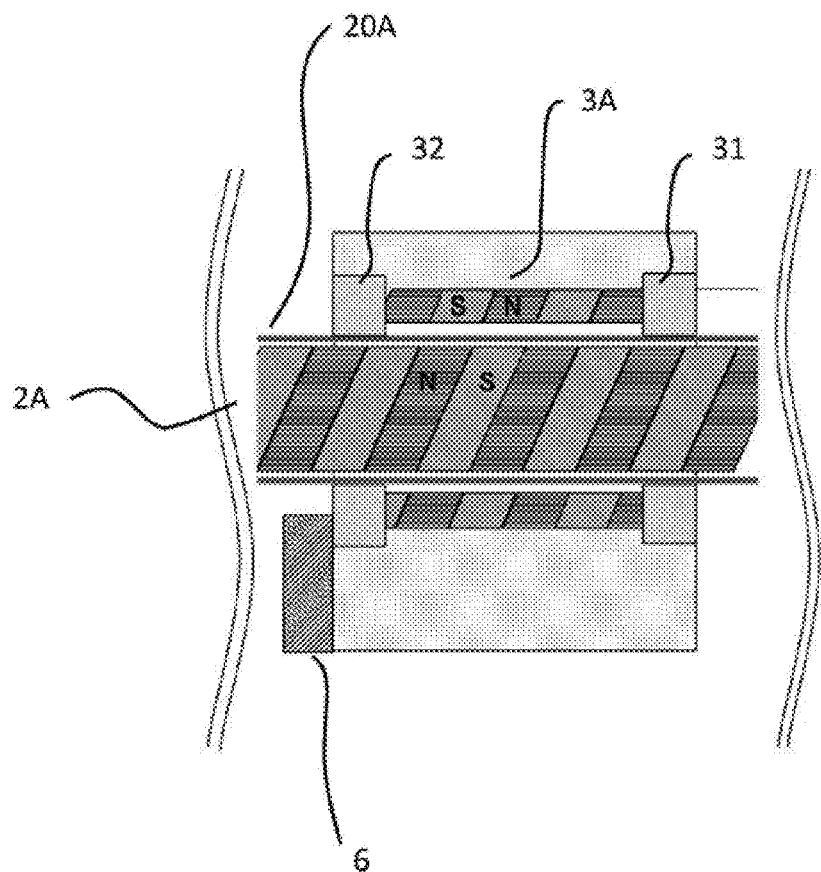
FIG. 15 is a schematic view illustrating a first rod-shaped member and an opposite member according to a fourth modification of the embodiment of the invention.

FIG. 3 to FIG. 6 illustrate the first rod-shaped member 2A provided with threads. In contrast, as illustrated in FIG. 15, the outer peripheral surface of the first rod-shaped member 2A may be provided with S pole magnetized zones and N pole magnetized zones alternately in a spiral shape. The same applies to the first rod-shaped member 2B and the second rod-shaped members 2C and 2D. The pitch of the magnetized zones of the first rod-shaped member 2A illustrated in FIG. 15 is substantially identical to the pitch of the magnetized zones of the opposite member 3A. When the first rod-shaped member 2A is rotated, a magnetic force acts between the magnetized zones of the first rod-shaped member 2A and the magnetized zones of the opposite member 3A, and the opposite member 3A moves.

Figure 16:
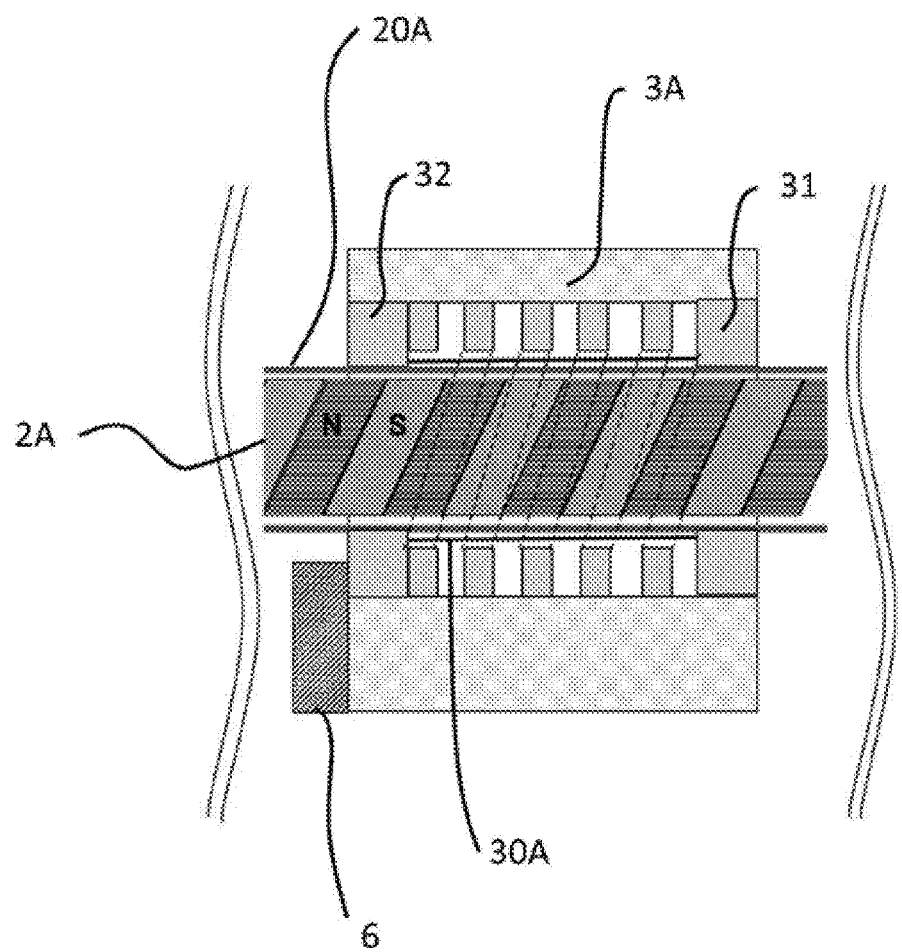
FIG. 16 is a schematic view illustrating the first rod-shaped member and the opposite member according to the fourth modification of the embodiment of the invention.

Alternatively, as illustrated in FIG. 16, the opposite member 3A may be a threaded magnetic material. The surface of a threaded hole in the opposite member 3A may be covered with a thin-walled pipe 30A formed of a nonmagnetic material. This can prevent foreign matters from adhering to a threaded groove of the opposite member 3A. The structure of the first rod-shaped member 2A is identical to that of FIG. 15. The pitch of the threads of the opposite member 3A illustrated in FIG. 16 is substantially identical to the pitch of the magnetized zones of the first rod-shaped member 2A. When the first rod-shaped member 2A is rotated, a magnetic force acts between the magnetized zones of the first rod-shaped member 2A and the threads of the opposite member 3A and the opposite member 3A moves.

Other Embodiments

As described above, the invention has been described by way of the embodiment, but it should not be understood that the description and the drawings that are parts of the disclosure limit the invention. It must be apparent to those skilled in the art that various alternative embodiments, examples, and operational techniques are clarified based on the disclosure. For example, the shape of the opposite member is not limited to the nut shape, but may be, for example, a concave shape. In this case, the rod-shaped member passes through the concave portion of the concave opposite member. S pole magnetized zones and N pole magnetized zones are alternately provided on the side surface of the concave portion of the concave opposite member. In addition, the storage housing may be a sterilization processing furnace or a fermenting furnace or may be a storage housing that does not undergo temperature control. In addition, the articles transferred to the inside and the outside of the storage housing are not limited to medicines, but may comprise foods, beverages, precision parts, etc., as well as any articles. In addition, the transfer apparatus is not necessarily combined with the storage housing. As described above, it should be understood that the invention encompasses various embodiments and the like not described in the specification.

REFERENCE SIGNS LIST

1: storage housing
2A, 2B: first rod-shaped member
2C, 2D: second rod-shaped member
3A, 3B: opposite member
4A, 4B: driving device
5: article
6: contact member
7: shelf board
12A, 12B, 12C, 12D: bearing
13A, 13B, 13C, 13D: bearing
15: transfer apparatus
20A: first cover
20C: second cover
22A: first terminal member
22C: third terminal member
23A: second terminal member
23C: fourth terminal member
30A: thin-walled pipe
31: guide ring
42A, 42C, 43A, 43C, 44A, 44C: welded portion
52A, 52C: bearing nut
60: guide
62A, 62C: fastening pin
63A, 63C: key
70, 70A, 70B: coupling member
83A, 83C: projection
84A, 84C, 85A, 85C: concave portion
86A, 86C, 87A, 87C: engagement portion
88A, 88C, 89A, 89C: mandrel portion

The invention claimed is:

1. A transfer apparatus comprising:
a first rod-shaped member comprising a magnetic material;
a first terminal member configured to allow insertion of a first end portion of the first rod-shaped member;
a second terminal member configured to allow insertion of a second end portion of the first rod-shaped member;
a second rod-shaped member comprising a magnetic material;
a third terminal member configured to allow insertion of a first end portion of the second rod-shaped member;
a fourth terminal member configured to allow insertion of a second end portion of the second rod-shaped member;
a coupling member configured to couple the second terminal member and the third terminal member; and
an opposite member facing a part of side surfaces of the first and second rod-shaped members and comprising a magnetic material,
wherein the first rod-shaped member and the first terminal member are not fixed, the first rod-shaped member and the second terminal member are fixed to each other, and when the first and second rod-shaped members rotate, the opposite member moves along central axes of the first and second rod-shaped members.

2. The transfer apparatus according to claim 1,
wherein a concave portion configured to allow insertion of the first end portion of the first rod-shaped member is provided in the first terminal member, and
an insertion depth of the first end portion of the first rod-shaped member is smaller than a depth of the concave portion of the first terminal member, so that an end surface surrounding the concave portion of the first terminal member does not make contact with the first rod-shaped member.

3. The transfer apparatus according to claim 1,
wherein the first rod-shaped member and the second terminal member are fixed to each other by welding.

4. The transfer apparatus according to claim 1,
wherein the first rod-shaped member and the second terminal member are fixed to each other by a fastening pin.

5. The transfer apparatus according to claim 1,
wherein the first rod-shaped member makes contact with the first terminal member via a key.

6. The transfer apparatus according to claim 1, further comprising:
a first cover configured to cover the first rod-shaped member, the first cover being formed of a nonmagnetic material;
wherein the first cover and the first terminal member are fixed to each other, and the first cover and the second terminal member are fixed to each other.

7. The transfer apparatus according to claim 6, wherein the first cover and the first terminal member are fixed to each other by welding, and the first cover and the second terminal member are fixed to each other by welding.

8. The transfer apparatus according to claim 1, wherein the first terminal member and the second terminal member are made of a nonmagnetic material.

9. The transfer apparatus according to claim 1, wherein the second rod-shaped member and the third terminal member are fixed to each other, and the second rod-shaped member and the fourth terminal member are not fixed to each other.

10. The transfer apparatus according to claim 9, wherein a concave portion configured to allow insertion of the second end portion of the second rod-shaped member is provided in the fourth terminal member, and an insertion depth of the second end portion of the second rod-shaped member is smaller than a depth of the concave portion of the fourth terminal member, so that an end surface surrounding the concave portion of the fourth terminal member does not make contact with the second rod-shaped member.

11. The transfer apparatus according to claim 9, wherein the second rod-shaped member and the third terminal member are fixed to each other by welding.

12. The transfer apparatus according to claim 9, wherein the second rod-shaped member and the third terminal member are fixed to each other by a fastening pin.

13. The transfer apparatus according to claim 9, wherein the second rod-shaped member makes contact with the fourth terminal member via a key.

14. The transfer apparatus according to claim 9, further comprising:
a second cover configured to cover the second rod-shaped member, the second cover being formed of a nonmagnetic material;
wherein the second cover and the third terminal member are fixed to each other, and the second cover and the fourth terminal member are fixed to each other.

15. The transfer apparatus according to claim 14, wherein the second cover and the third terminal member are fixed to each other by welding, and the second cover and the fourth terminal member are fixed to each other by welding.

16. The transfer apparatus according to claim 9, wherein the third terminal member and the fourth terminal member are made of a nonmagnetic material.

17. The transfer apparatus according to claim 1, wherein the first rod-shaped member is stored in a furnace.

18. The transfer apparatus according to claim 1, wherein the first and second rod-shaped members are stored in a furnace.

19. The transfer apparatus according to claim 1, further comprising a driving device connected to the first terminal member, the driving device being configured to rotate the first and second rod-shaped members about the central axes of the first and second rod-shaped members.

20. The transfer apparatus according to claim 1, further comprising a driving device connected to the fourth terminal member, the driving device being configured to rotate the first and second rod-shaped members about the central axes of the first and second rod-shaped members.

* * * * *